(12) United States Patent
Schwarze et al.

(10) Patent No.: US 10,093,123 B2
(45) Date of Patent: Oct. 9, 2018

(54) METHOD AND APPARATUS FOR GENERATING A WORK PIECE CONTAINING AN INFORMATION CODE

(71) Applicant: SLM Solutions Group AG, Luebeck (DE)

(72) Inventors: Dieter Schwarze, Luebeck (DE); Thomas Niendorf, Paderborn (DE); Mirko Schaper, Salzkotten (DE); Florian Brenne, Paderborn (DE); Wadim Reschetnik, Paderborn (DE); Stefan Leuders, Bielefeld (DE); Andre Riemer, Paderborn (DE)

(73) Assignee: SLM Solutions Group AG, Luebeck (DE)

( * ) Notice: Subject to any disclaimer, the term of this patent is extended or adjusted under 35 U.S.C. 154(b) by 402 days.

(21) Appl. No.: 14/553,526

(22) Filed: Nov. 25, 2014

(65) Prior Publication Data

US 2015/0147585 A1   May 28, 2015

(30) Foreign Application Priority Data

Nov. 25, 2013  (EP) .................................... 13194232

(51) Int. Cl.
*B22F 3/105* (2006.01)
*B42D 25/30* (2014.01)
(Continued)

(52) U.S. Cl.
CPC ............ *B42D 25/30* (2014.10); *B22F 3/1055* (2013.01); *B23K 26/342* (2015.10);
(Continued)

(58) Field of Classification Search
CPC .................................................. B22F 3/1055
See application file for complete search history.

(56) References Cited

U.S. PATENT DOCUMENTS

| 2002/0166896 A1* | 11/2002 | Mazumder | ............... G06K 1/12 |
| | | | 235/487 |
| 2003/0206820 A1* | 11/2003 | Keicher | ................... B05B 7/14 |
| | | | 419/9 |
| 2011/0035597 A1 | 2/2011 | Kevenaar | |

FOREIGN PATENT DOCUMENTS

| DE | 10 2009 043317 A1 | 3/2011 |
| EP | 2335848 A1 | 6/2011 |

(Continued)

OTHER PUBLICATIONS

Extended European Search Report, EP 13194232.8, SLM Solutions GmbH, dated Mar. 17, 2014.

(Continued)

*Primary Examiner* — Jessee R Roe
*Assistant Examiner* — Ngoclan Thi Mai
(74) *Attorney, Agent, or Firm* — Taft, Stettinius & Hollister, LLP

(57) ABSTRACT

A method and an apparatus (10) for generating a three-dimensional work piece containing an information code are provided. The method comprises the steps of applying a raw material powder (18) onto a carrier (14) by means of a powder application device (16), irradiating electromagnetic or particle radiation (22) onto the raw material powder (18) applied onto the carrier (14) by means of an irradiation device (20), and controlling the operation of the powder application device (16) and the irradiation device (20) so as to generate an information code pattern (36) on or in the work piece (12), wherein the information code pattern (36) is defined by the microstructure (34) of the work piece (12).

11 Claims, 3 Drawing Sheets

Figure 1:
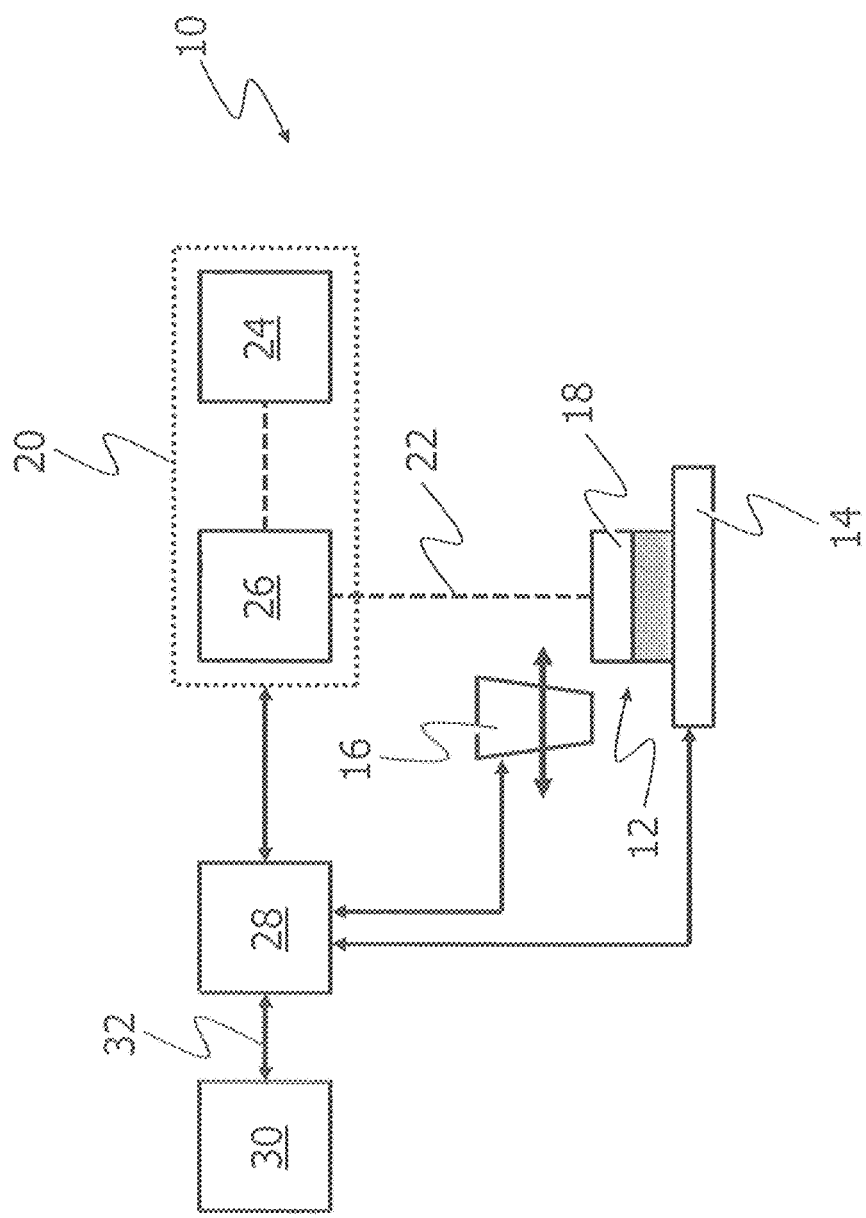

(51) Int. Cl.
  *B23K 26/342* (2014.01)
  *B42D 25/40* (2014.01)
  *G06K 19/08* (2006.01)
  *G06K 19/06* (2006.01)
  *B29C 64/153* (2017.01)
  *B33Y 10/00* (2015.01)
  *B33Y 30/00* (2015.01)
  *B33Y 80/00* (2015.01)

(52) U.S. Cl.
  CPC ............ *B29C 64/153* (2017.08); *B42D 25/40* (2014.10); *G06K 19/06084* (2013.01); *G06K 19/086* (2013.01); *B22F 2003/1057* (2013.01); *B33Y 10/00* (2014.12); *B33Y 30/00* (2014.12); *B33Y 80/00* (2014.12); *C22C 2200/00* (2013.01); *Y02P 10/295* (2015.11); *Y10T 428/12014* (2015.01)

(56) References Cited

FOREIGN PATENT DOCUMENTS

WO    2005099635 A1    10/2005
WO    2011036087 A1    3/2011

OTHER PUBLICATIONS

Niendorf Thomas et al, "Functionally Graded Alloys Obtained by Additive Manufacturing", Advanced Engineering Materials, 2014, vol. 16, No. 7, pp. 857-861.

Niendorf Thomas et al, "Highly Anisotropic Steel Processed by Selective Laser Melting", Metallurgical and Materials Transactions B, 2013, vol. 44 B, pp. 794-796.

Niendorf Thomas et al, "Labeling additively manufactured parts by microstructural gradation"—advanced copy—proof design, submitted to Rapid Prototyping Journal, Sep. 2014.

* cited by examiner

METHOD AND APPARATUS FOR GENERATING A WORK PIECE CONTAINING AN INFORMATION CODE

The invention relates to a method and an apparatus for generating a three-dimensional work piece containing an information code. Furthermore, the invention relates to a three-dimensional work piece containing an information code.

Selective laser melting or selective laser sintering is an additive layering process, by which pulverulent, in particular, metallic and/or ceramic raw materials can be processed to three-dimensional work pieces of complex shapes. To that end, a raw material powder layer is applied onto a carrier and subjected to laser radiation in a site-selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or selective laser sintering can be used, in particular, for generating prototypes, tools, replacement parts, such as, for example, aircraft turbine blades, or medical prostheses, such as, for example, dental or orthopaedic prostheses, or for repairing such products, on the basis of CAD data. Instead of laser radiation, any suitable electromagnetic radiation or particle radiation may be used as well.

Typically, it is desired for quality control, tracking and/or verification reasons that generated work pieces are provided with some kind of information, such as an information code. Usually, in a first generating method step, the generation of the work piece is completed, and then, in a second post-generating method step, the completely generated work piece is provided with an information code, for example, by printing, impressing or stamping the information code on the work piece. These two timely separated method steps result in a time consuming production process.

Alternatively, the work piece may be provided with an information code during its generation. For example, document DE 10 2009 043 31 A1 suggests the generation of a three-dimensional work piece with a three-dimensional symbol code, wherein raw material powder is solidified such that the three-dimensional symbol code is generated by components having different distances (heights and depths) from the surface of the work piece. This, however, results in hollow cavities on or in the work piece, which impair the mechanical stability of the work piece.

Document WO 2005/099635 A1 suggests the forming of identifiable structures in a solid freeform fabrication system, wherein a build material and a contrast enhancing material are provided and, during a three-dimensional work piece is constructed from the build material, the identifiable structure is fabricated from layers of the contrast enhancing material. Therefore, two different kinds of materials are mandatory, which makes the generating process complex.

It is an object of the present invention to provide a method and an apparatus, which allow a stable three-dimensional work piece containing an information code to be generated in a simple manner. Furthermore, is it an object of the present invention to provide a stable three-dimensional work piece containing an information code which can be generated in a simple manner.

This object is achieved by a method according to claim 1, an apparatus according to claim 8 and a work piece according to claim 15.

A method for generating a three-dimensional work piece comprises the steps of applying a raw material powder onto a carrier by means of a powder application device. The raw material powder may be a metallic, a polymeric, a ceramic and/or a composite material powder. In particular, the raw material powder may be stainless steel, iron (Fe), cobalt (Co) and/or nickel (Ni) powder. For example, the raw material powder may have a nominal chemical composition (in weight %) of 0.02% C, 17% Cr, 10.5% Ni, and 2.3% Mo, the balance being Fe. The particle size, in particular, the mean particle size of the raw material powder may <100 µm, preferably around 40 µm. The carrier may be disposed in the process chamber which is sealable against the ambient atmosphere and may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. The powder application device may be designed as described, e.g., in EP 2 202 016 B1, but may also comprise a nozzle as typically used in a cladding process, in particular a laser cladding process.

The raw material powder applied onto the carrier is irradiated with electromagnetic or particle radiation by means or an irradiation device. In particular, the raw material powder applied onto the carrier may be subjected to electromagnetic or particle radiation in a site-selective manner in dependence on the desired geometry of the work piece that is to be produced. It is, however, also conceivable to use a cladding process, in particular a laser cladding process for generating the work piece. The irradiation device preferably is adapted to irradiate radiation onto the raw material powder which causes a site-selective melting of the raw material powder particles and may comprise at least one radiation source, in particular a laser source, and at least one optical unit for guiding and/or processing a radiation beam emitted by the radiation source.

The radiation source may comprise a diode pumped Ytterbium fibre laser emitting laser light at a wavelength of approximately 1070 to 1080 nm. The optical unit may comprise optical elements such an object lens, in particular and f-theta lens, and a scanner unit, the scanner unit preferably comprising a diffractive optical element and a deflection mirror. For example, the irradiation device may be an irradiation device as described in EP 2 335 848 A1. The irradiation device may also employ a plurality of radiation sources. For example, radiation sources, in particular laser sources of different nominal power may be used for altering the solidification mechanisms during processing of the raw material powder in distinct areas of the work piece.

The operation of the powder application device and the irradiation device is controlled, e.g. by means of a suitable preferably electronic control unit, so as to generate an information code pattern on or in the work piece, wherein the information code pattern is defined by the microstructure of the work piece. In other words, the operation of the powder application device and the irradiation device is controlled in such a manner that the microstructure of the work piece is in particular locally tailored in order to generate the information code patterns on or in the work piece. As a result, the information code contained in or on the work piece is realized by the microstructure of the work piece itself. Hence, the information code can be realized without mandatorily generating hollow cavities on or in the work piece, which would impair the mechanical stability of the work piece. This allows generating a stable work piece containing an information cede. The integration of inimitable component information can be realized. Unauthorized replication can be prevented. Thus, identification and tracking of individual work pieces is possible. Hence, the present invention allows overcoming the susceptibility of additive manufacturing techniques for product piracy by providing a method for introducing and reading out product identification markers that are not visible by naked-eye inspection.

As a further result, for providing the work piece with the information code, it is only mandatory to provide a single kind of raw material powder, namely the raw material powder, which is necessary to generate the work piece anyway. In contrast, a second kind of raw material powder, such as an additional contrast enhancing material, is not necessary. This allows a work piece containing an information code to be generated in a simple manner.

The microstructure of the work piece may be defined by at least one of a size of grains contained in the microstructure, a grain morphology of the microstructure and a texture of the microstructure. The grain morphology and/or the texture of the microstructure may be defined by at least one of a substantially directionally/dendritically solidified texture, a substantially polycrystalline texture, a substantially globulitic texture, an anisotropic texture, an isotropic texture and a spatial direction of an anisotropic texture with respect to a build direction. Additionally or alternatively, the grain morphology and/or the texture of the microstructure may be defined by at least one of a substantially directionally/dendritically solidified grain morphology, a substantially polycrystalline grain morphology, a substantially globulitic grain morphology.

The information code may represent a production date, a production location, a production method, a production apparatus, a producer, a company, a production series, a serial number, an identification of the work piece, a destination, or the like. The information code may be generated automatically. Alternatively, the information code may be generated based on information input by means of an input device. The input information may be, for example, a letter, a word, a number, or the like. For example, the control unit may be configured to convert the input information into the information code by employing an encoding scheme. The encoding scheme may be any known encoding scheme, such as a scheme encoding the inputted information into a linear barcode or a two-dimensional matrix code (e.g. QR-code), or the like.

The information code may be represented by a first information code state or value and at least one second information code state or value, wherein the first state/value and the second state/value differ and are thus distinguishable. The first information code state/value and the second information code state/value may be, for example, 0 and 1, or black and white, or all integer numbers from 0 to 10, or all roman letters, or the like.

The operation of the powder application device and the irradiation device may be controlled so as to tailor the microstructure of the work piece generated from the raw material powder by an additive construction method such that a specific physically determinable microstructure parameter defining the microstructure is set in a first state or value and at least one second state or value based on the information code, wherein the first state/value of the specific physically determinable microstructure parameter corresponds to a first information code state/value and the at least one second state/value of the specific physically determinable microstructure parameter corresponds to at least one second information code state/value. The first state/value and the second state/value may differ and may thus be distinguishable.

As a result, the first and the second state/value of the specific physically determinable microstructure parameter may define the information code pattern, namely by mapping the first and the second information code state/value onto the information code pattern on or in the work piece. Thus, the information code pattern may represent a mapping of the information code onto the microstructure of the work piece. Hence, the above method allows providing the generated work piece with arbitrary information encoded in an information code pattern. Further, since the information code pattern is encoded by a physically determinable microstructure parameter, the information code pattern and thus the information code can be read out from the work piece, namely by determining the states/values of the physically determinable microstructure parameter defining the information code pattern by use of suitable measuring techniques. For example, the operation of the powder application device and the irradiation device may be controlled in such a manner that the microstructure and/or its mechanical properties is/are determinable by electron backscatter diffraction (EBSD) and/or a hardness measurement. The applicability of an eddy current technique for reading out local differences in electro-magnetic properties is also conceivable.

A specific physically determinable microstructure parameter defining the microstructure may be, for example, a material composition or a material distribution within the microstructure, a size of grains contained in the microstructure, a grain morphology, a texture, a spatial direction of an anisotropic texture with respect to a build direction (along which the raw material powder is stacked in layers), a mechanical property, e.g. strength, toughness, ductility, hardness, or wear resistance, a thermal property, e.g. thermal conductivity, an electrical property, e.g. ohmic resistance, or permittivity, a magnetic property, e.g. magnetic permeability, or inductivity, and/or a chemical property, e.g. corrosion resistance, or chemical reactivity. As a result of at least some of these physical determinations, the inscribed microstructure and/or information code pattern can be non-destructively visualized, e.g. by eddy current methodology.

The operation of the powder application device and the irradiation device may be controlled so as to tailor the microstructure of the work piece generated from the raw material powder by an additive construction method such that the first state/value of the specific physically determinable microstructure parameter on the one hand and the second state/value of the specific physically determinable microstructure parameter on the other hand are defined by, for example, a first material composition or a first material distribution within the microstructure on the one hand and a second material composition or a second material distribution within the microstructure on the one hand. The first and the second material composition or the first and the second material distribution may be generated by suitably controlling the operation of the powder application device and the irradiation device so as to generate different kinds of e.g. alloy phases, precipitations, etc. in different regions of the work piece.

Additionally or alternatively, the first state/value of the specific physically determinable microstructure parameter on the one hand and the second state/value of the specific physically determinable microstructure parameter on the other hand may be defined by a relatively coarse grain size on the one hand and a relatively fine grain size on the other hand. The relatively coarse grain size may be larger than about 100 μm, larger than about 300 μm or larger than about 500 μm. Further, the first state/value of the specific physically determinable microstructure parameter may be defined by a substantially single crystalline microstructure, i.e. a microstructure, which does not comprise grain boundaries. The relatively fine grain size may be smaller than about 100 μm or smaller than about 50 μm.

Further, the first state/value of the specific physically determinable microstructure parameter on the one hand and the second state/value of the specific physically determinable microstructure parameter on the other hand may be defined by a directionally/dendritically solidified texture on the one hand and a substantially polycrystalline and/or substantially globulitic texture on the other hand. The directionally/dendritically solidified texture may be a substantially single crystalline microstructure which does not comprise grain boundaries, but may also be a microstructure, which does have grain boundaries between grains having a preferred orientation, i.e. a microstructure, in which the grain boundaries extend substantially parallel to each other in a preferred direction. Such a microstructure typically is obtained by a directional solidification of metallic melts.

Moreover, the first state/value of the specific physically determinable microstructure parameter on the one hand and the second state/value of the specific physically determinable microstructure parameter on the other hand may be defined by an anisotropic texture on the one hand and an isotropic texture on the other hand, and/or a first spatial direction of an anisotropic texture with respect to a build direction on the one hand and a second spatial direction of the anisotropic texture with respect to the build direction on the other hand, or vice versa.

The various examples of first and second states/values discussed above optically differ from each other, for example, when being observed by or through a microscope. Hence, an information code pattern defined by these first and second states/values is optically readable by an optical measurement technique. This allows an optical and thus non-destructive identification of the information code.

In order to tailor the microstructure of the work piece so as to define the first state/value of the specific physically determinable microstructure parameter on the one hand and the second state/value of the specific physically determinable microstructure parameter on the other hand, the operation of the powder application device and the irradiation device may be controlled in dependence on the crystallization behavior of the irradiated and thus melted raw material powder. The crystallization behavior of a melt, in particular, a metallic melt, may be described, for example, by the so-called v-G-diagram, wherein the solidification or crystal growth velocity v is plotted against the temperature gradient G, typically on a double logarithmic scale. A v-G-diagram may be measured or calculated for any desired material, as it is well known in the art and described, for example, in the publication by J. D. Hunt entitled "Steady State Columnar and Equiaxed Growth of Dendrites and Eutectic", Material Science and Engineering, Vol. 65, 1984, pages 75 to 83. Within the v-G-diagram, different regions of v-G-combinations are associated with different microstructural properties of the solidified melt. For example, high solidification or crystal growth velocities and low temperature gradients lead to the development of a polycrystalline and/or globulitic microstructure, whereas low solidification or crystal growth velocities in combination with (local) undercooling of the melt due to high temperature gradient result in the formation of dendrites and a single crystalline and/or directionally/dendritically solidified microstructure.

Operational parameters of the irradiation device which may be controlled in order to effectively tailor the microstructure of a three-dimensional work piece generated by an additive layering process may be a beam size of a radiation beam irradiated onto the raw material powder applied onto the carrier (such as a beam size of about 200 μm, 500 μm, 700 μm or more), a beam profile of a radiation beam irradiated onto the raw material powder applied onto the carrier (suck as a Gaussian profile or a top hat profile), a scan speed of a radiation beam irradiated onto the raw material powder applied onto the carrier (such as about 500 mm per second), a scan pattern according to which a radiation beam is irradiated onto the raw material powder applied onto the carrier, a distance between hatches, along which the radiation beam is guided over the raw material powder (such as a hatch distance of about less than 1 mm), an output power of the radiation source (such as an output power of less than 2000 W, e.g. 400 W or 1000 W), intensity or energy of a radiation beam irradiated onto the raw material powder applied onto the carrier. Operational parameters of the powder application device which may be controlled in order to effectively tailor the microstructure of a three-dimensional work piece generated by an additive layering process may be a thickness of a raw material powder layer applied onto the carrier (such as a thickness from about 40 μm to about 200 μm or from about 50 μm to about 150 μm or a thickness of less than 100 μm). Additionally, the raw material powder, prior to irradiating the electromagnetic or particle radiation onto the raw material powder, may be preheated by means of a heating device.

A detailed description of the operational parameters of the powder application device and the irradiation device which may be controlled in order to effectively tailor the microstructure of a three-dimensional work piece generated by an additive layering process may be found in international patent application PCT/EP2013/053946 and in the publication by T. Niendorf at al. "Highly Anisotropic Steel Processed by Selective Laser Melting". Metallurigcal and Materials Transactions B, Vol. 44B, August 2013, pages 794 to 796.

Additionally or alternatively, the operation of the powder application device and the irradiation device may be controlled so as to tailor the microstructure of the work piece generated from the raw material powder by an additive construction method such that the first state/value of the specific physically determinable microstructure parameter on the one hand and the second state/value of the specific physically determinable microstructure parameter on the other hand are defined by, for example, a first value of a mechanical property such as, e.g., strength, toughness, ductility, hardness or wear resistance on the one hand and a second value of the mechanical property on the other hand, a first value of a thermal property such as, e.g., thermal conductivity on the one hand and a second value of the thermal property on the other hand, a first value of an electrical property such as, e.g., ohmic resistance or permittivity on the one hand and a second value of the electrical property on the other hand, a first value of a magnetic property such as, e.g., magnetic permeability or inductivity on the one hand and a second value of the magnetic property on the other hand, and/or a first value of a chemical property such as, e.g., corrosion resistance or chemical reactivity on the one hand and a second value of the chemical property on the other hand.

As a result, the first and the second state/value may differ in their mechanical, thermal, electrical and/or chemical properties. Hence, the information code pattern being defined by the first and the second state/value may be mechanically readable, for example, by a hardness measurement technique, such as material deformation due to monotonic loading, may be thermally readable, for example, by a thermal conductivity measurement technique, may be electrically readable, for example, by an electrical (ohmic) resistance measurement technique or by an eddy current measurement Technique, and/or may be chemically readable, for example, by a chemical reactivity measurement technique. Preferably, the information code pattern is read by a measurement technique which allows a non-destructive reading of the information code pattern.

The operation of the powder application device and the irradiation device may be controlled so as to tailor the microstructure of the work piece generated from the raw material powder by an additive construction method such that the first value/state of the physically determinable microstructure parameter is located on or restricted to a first spatial portion of the work piece and/or such that the second state/value of the physically determinable microstructure parameter is located on or restricted to a second spatial portion of the work piece, wherein the first and second portions may be spatially disjoint.

As a result, the information code pattern being defined by the first and the second state/value located on or restricted to predetermined spatial portions of the work piece is readable by a position resolved measuring technique, such as, for example, a position resolved optical measurement technique, a position resolved hardness measurement technique, a position resolved thermal conductivity measurement technique, a position resolved electrical (ohmic) resistance measurement technique, a position resolved eddy current measurement technique, a position resolved chemical reactivity measurement technique, or the like.

The operation of the powder application device and the irradiation device may be controlled so as to tailor the microstructure of the work piece generated from the raw material powder by an additive construction method such that the first state/value and/or the second state/value or the physically determinable microstructure parameter is/are located on or restricted to (a) spatial portion(s) within or inside (in particular, completely inside) the completed work piece. As a result, the information code pattern is not visible from outside the work piece, but readable by material penetrating measuring techniques such as an eddy current measurement technique.

The operation of the powder application device and the irradiation device may be controlled so as to tailor the microstructure of the work piece generated from the raw material powder by an additive construction method such that the information code pattern forms a linear barcode and/or a two-dimensional matrix code such as a QR-code.

An apparatus for generating a three-dimensional work piece comprises a carrier, a powder application device for applying a raw material powder onto the carrier, an irradiation device for irradiating electromagnetic or particle radiation onto the raw material powder applied onto the carrier, and a control unit which is configured to control the operation of the powder application device and the irradiation device so as to generate an information code pattern on or in the work piece, wherein the information code pattern is defined by the microstructure of the work piece.

The control unit may be configured to control the operation of the powder application device and the irradiation device so as to tailor the microstructure of the work piece made of the raw material powder by an additive construction method such that a specific physically determinable microstructure parameter defining the microstructure is set in a first state or value and at least one second state or value based on the information code having a first information code state or value and at least one second information code state or value, wherein the first state/value of the specific physically determinable microstructure parameter corresponds to the first information code state/value and the at least one second state/value of the specific physically determinable microstructure parameter corresponds to the at least one second formation code state/value.

The control unit may further be configured to control the operation of the powder application device and the irradiation device so as to tailor the microstructure of the work piece such that the first state/value of the specific physically determinable microstructure parameter on the one hand and the second state/value of the specific physically determinable microstructure parameter on the other hand are defined by at least one of a first material composition or a first material distribution within the microstructure on the one hand and a second material composition or a second material distribution within the microstructure on the other hand, a relatively coarse grain size on the one hand and relatively fine grain size on the other hand, a substantially directionally/dendritically solidified texture on the one hand and a substantially polycrystalline and/or substantially globulitic texture on the other hand, an anisotropic texture on the one hand and an isotropic texture on the other hand, and a first spatial direction of an anisotropic texture with respect to a build direction on the one hand and a second spatial direction of the anisotropic texture with respect to the build direction on the other hand, or vice versa.

The control unit may further be configured to control the operation of the powder application device and the irradiation device so as to tailor the microstructure of the work piece such that the first state/value of the specific physically determinable microstructure parameter on the one hand and the second state/value of the specific physically determinable microstructure parameter on the other hand are defined by at least one of a first value of a mechanical property on the one hand and a second value of the mechanical property on the other hand, a first value of an electrical property on the one hand and a second value of the electrical property on the other hand, a first value of a thermal property and a second value of the thermal property on the other hand, a first value of a magnetic property on the one hand and a second value of the magnetic property on the other hand, and a first value of a chemical property on the one hand and a second value of the chemical property on the other hand, or vice versa.

The control unit may further be configured to control the operation of the powder application device and the irradiation device so as to tailor the microstructure of the work piece such that the first state/value of the physically determinable microstructure parameter is located on or restricted to a first spatial portion of the work piece and the second state/value of the physically determinable microstructure parameter is located on or restricted to a second spatial portion of the work piece, wherein the first and second portions are spatially disjoint.

The control unit may further be configured to control the operation of the powder application device and the irradiation device so as to tailor the microstructure of the work piece such that the information code pattern forms a linear barcode and/or a two-dimensional matrix code such as a QR code.

To the extent that a method or individual steps of a method for generating a work piece containing an information code is/are described in this description, the method or individual steps of the method can be executed by an appropriately configured apparatus for generating a work piece containing an information code and/or by an appropriately configured device of such an apparatus. Analogous remarks apply to the elucidation of the mode of operation of an apparatus for generating a work piece containing an information code and/or devices of such an apparatus that execute(s) method steps. To this extent, apparatus features and method features of this description are equivalent.

A three-dimensional work piece is generated by irradiating layers of a raw material powder with electromagnetic or particle radiation and exhibits an information code pattern defined by the microstructure of the work piece.

Figure 2:
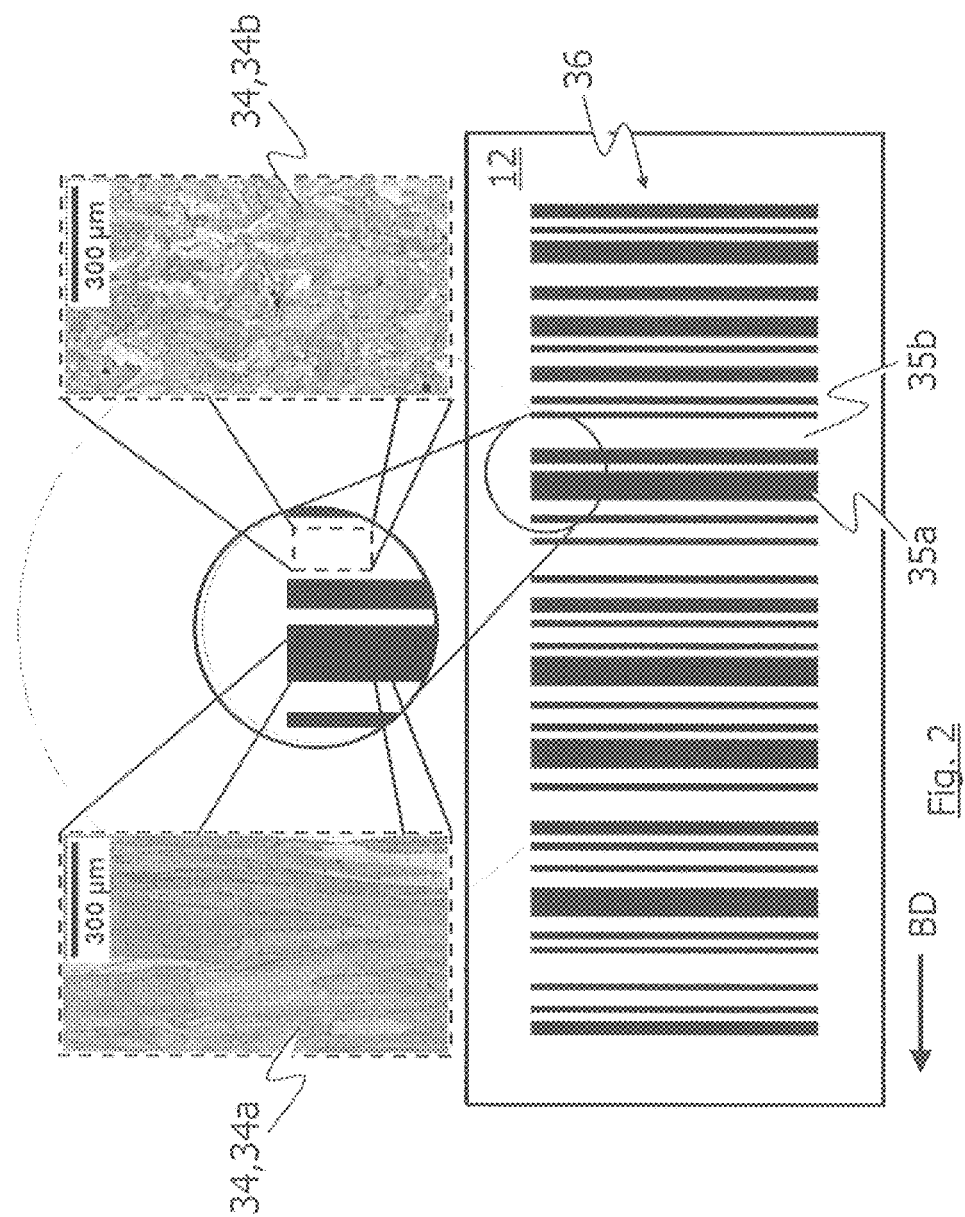
Figure 3:
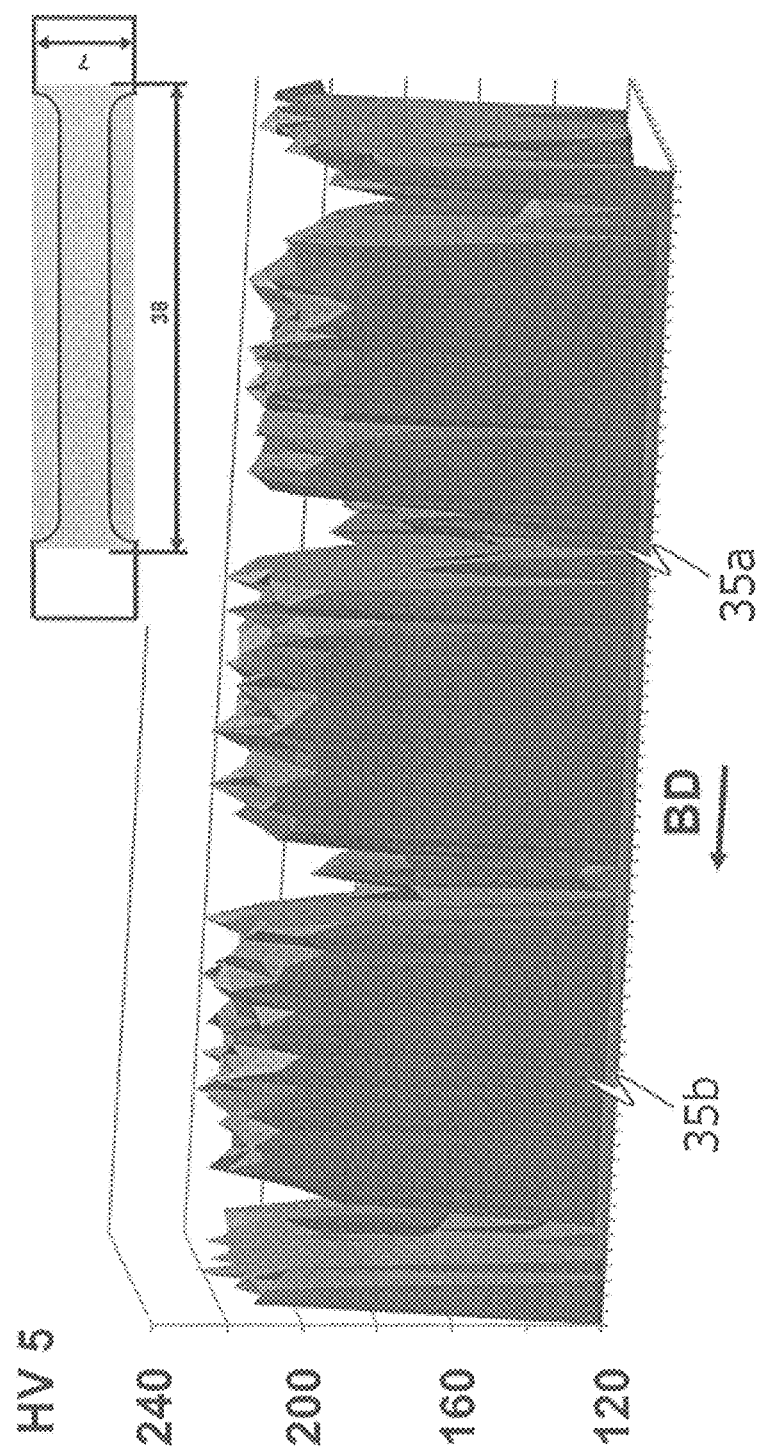

Further features, advantages and technical effects of the invention will become apparent from the following description of exemplary embodiments with reference to the accompanying drawings, in which:

FIG. 1 schematically illustrates an apparatus for generating a three-dimensional work piece containing an information code pattern, FIG. 2 schematically illustrates an information code pattern on or in a work piece generated by the apparatus of FIG. 1, and FIG. 3 illustrates a hardness map obtained from an information code pattern.

FIG. 1 shows an apparatus 10 for generating a three-dimensional work piece 12. The apparatus 10 comprises a carrier 14 and a powder application device 16 for applying a raw material powder 18 onto the carrier 14. The raw material powder 18 has a nominal chemical composition (in weight %) of 0.02% C, 17% Cr, 10.5% Ni, and 2.3% Mo, the balance being Fe. The raw material powder 18 is provided in form of a spherical powder with a mean particle size of 40 µm. The apparatus 10 further comprises an irradiation device 20 for emitting electromagnetic or particle radiation 22. In particular, the electromagnetic or particle radiation 22 is emitted by at least one radiation source 24 of the irradiation device 20 and is guided and/or processed by at least one optical unit 26 of the irradiation device 20. The carrier 14 is designed to be displaceable in vertical direction so that, with increasing construction height of a work piece, as it is built up in layers from the raw material powder on the carrier 14, the carrier 14 can be moved downwards in the vertical direction. The operation of the carrier 14, the powder application device 16 and the irradiation device 20 is controlled by means of a control unit 28. The apparatus 10 further comprises an input device 30 for inputting arbitrary information 32.

The control unit 28 converts information 32 input by the input device 30 into an information code by employing a known encoding scheme, such as a linear barcode or a two-dimensional matrix code (e.g. QR-code), or the like. Alternatively, the control unit 28 converts automatically generated information into the information code. The information and thus the information code may represent a production date, a production location, a production method, a production apparatus, a producer, a company, a production series, a serial number, an identification of the work piece, a destination, or the like.

For example, the input information 32 is indicative of a specific production apparatus and the information code is a linear barcode. In this case, the control unit 28 converts the data indicative of the specific production apparatus into a linear barcode encoding for example a name and/or a serial number of the specific production apparatus. The information code (i.e. the linear barcode) is represented by a first information code state, namely black bars or just state "black", and a second information code state, namely white bars or just state "white".

In a further step, the work piece 12 containing the information code is generated. To this end, the control unit 28 controls the carrier 14, the powder application device 16 and the irradiation device 20 in dependence on the crystallization behavior of the raw material powder 18, in order to tailor the microstructure 34 of the work piece 12 generated from the raw material poser 18 by an additive construction method such that specific physically determinable microstructure parameter defining the microstructure 34 of the generated work piece is set in a first state 34a and a second state 34b based on the information code, wherein the first state 34a of the specific physically determinable microstructure parameter corresponds to the first information code state (black) and the second state 34b of the specific physically determinable microstructure parameter corresponds to the second information code state (white) (see FIG. 2).

The first state 34a and the second state 34b differ from each other and are thus distinguishable. In the present example, the specific physically determinable microstructure parameter defining the microstructure 34 is the grain size of the microstructure 34 and the texture of the microstructure 34. The control unit 28 controls the carrier 14, the powder application device 16 and/or the irradiation device 20 in dependence on the crystallization behavior of the raw material powder 18, in order to tailor the microstructure 34 of the work piece 12 made of the raw material powder 18 by an additive construction method such that the first state 34a of the specific physically determinable microstructure parameter is restricted to a first spatial portion 35a of the work piece 12 (namely the portions indicated by the black bars of the work piece 12, see FIG. 2) and is defined by a relatively coarse grain size and by an anisotropic and substantially single crystalline and directionally solidified texture. Contrary thereto, the second state 34b of the specific physically determinable microstructure parameter is restricted to a second spatial portion 35b of the work piece 12 (namely the portions indicated by the white bars between the black bars of the work piece 12, see FIG. 2) and is defined by a relatively fine grain size and by an isotropic and substantially polycrystalline and globulitic texture (see FIG. 2).

As a result the first and second states 34a, 34b of the specific physically determinable microstructure parameter define an information code pattern 36 by mapping the first and second information code states (black and white of the linear barcode) onto the information code pattern 36 on or in the work piece 12. Thus, the information code pattern 36 represents a biunique mapping of the information code onto the microstructure 34 of the work piece 12, wherefore the information code pattern 36 also forms the desired linear barcode (see FIG. 2). Hence, the generated work piece 12 is provided with the desired information (the word "pattern") encoded in the information code pattern 36.

Further, since the information code pattern 36 is encoded by a physically determinable microstructure parameter, namely the grain size and the texture of the microstructure 34, the information code pattern 36 and thus the provided information can be read out from the work piece 12, namely by determining the first and second states 34a, 34b of the physically determinable microstructure parameter by use of a position resolved optical and thus non-destructive measurement technique (e.g., microscope).

Additionally, the different first and second states 34a, 34b of the specific physically determinable microstructure parameter result in different and distinguishable values of mechanical properties (e.g., strength, toughness, ductility, hardness or wear resistance), of thermal properties (e.g., thermal conductivity), of electrical properties (e.g., ohmic resistance or permittivity), of magnetic properties (e.g., magnetic permeability or inductivity) and of chemical properties (e.g., corrosion resistance or chemical reactivity) for the first and second states 34a, 34b.

As a result, the first and second states 34a, 34b differ in their mechanical, thermal, electrical and/or chemical properties. Hence, the information code pattern 36 being defined by the first and second states/values 34a, 34b is also mechanically readable, for example, by a position resolved hardness measurement technique, such as material deformation due to monotonic loading, thermally readable, for example, by a position resolved thermal conductivity measurement technique, electrically readable, for example, by a position resolved electrical (ohmic) resistance measurement technique or by an eddy current measurement technique, and chemically readable, for example, by a position resolved chemical reactivity measurement technique.

If desired, the control unit 28 may control the carrier 14, the powder application device 16 and the irradiation device 20 in dependence on the crystallization behavior of tire raw material powder 18, in order to tailor the microstructure 34 of the work piece 12 made of the raw material powder 18 by an additive construction method such that the, for example, first state 34a of the physically determinable microstructure parameter is restricted to a spatial portion 35a completely inside the completed work piece 12 (see FIG. 2). In this case, the information code pattern 36 is not visible from outside the work piece 12, but readable by material penetrating measuring techniques such as a position resolved eddy current measurement technique.

FIG. 2 shows a three-dimensional sample work piece 12 containing an information code pattern 36 which is generated by the apparatus 10 of FIG. 1, wherein the apparatus 10 may comprise an irradiation device 20 having two laser irradiation sources 24. A first laser radiation source may emit electromagnetic radiation of 1000 W power, wherein a second laser radiation source may emit electromagnetic radiation of 400 W power so as to produce the spatial portions 35a and 35b of the work piece 12 which are irradiated by the first 1000 W laser radiation source and the second 400 W laser radiation source, respectively (see FIG. 2). Depending on the laser radiation source employed, a layer thickness of the raw material powder during manufacturing may be between 50 µm and 150 µm. The control unit (not shown) of the apparatus 100 may control the process parameters such that a similar energy density is provided to the raw material powder irrespective of the power of the first and the second laser radiation source.

For appropriate use of the here suggested labeling method, it should be clearly distinguished between the two different microstructures (black and white). FIG. 3 depicts a hardness map obtained in the sample gauge length (BD; horizontal axis). As shown, the mean hardness values (HV; vertical axis) differ significantly for the two microstructures (black and white), revealing a value of about 215 HV for the fine-grained regions 35b (white; 400 W) and 190 HV for the columnar coarse-grained region 35a (black; 1000 W).

The complexity of the embedded information code pattern 36 can be easily increased. For example, the shape of wither region (black and white, respectively) can be directly manipulated. As another example, the information code pattern 36 can be introduced in any area of the work piece 12, such as even beneath the outer surface the work piece 12, which is not visible by naked-eye inspection. In turn, highly loaded areas of the work piece 12, may not be suited for labeling, since the microstructure of a modified section may lead to inferior mechanical properties, e.g. in terms of yield strength of a columnar coarse-rained region. Thus, placement of the information code pattern 36 may also require thorough load distribution analyses and, if necessary, adaptation of the geometry of the work piece 12, in order to fully preserve the load bearing capacity of each single section of the work piece 12.

The invention claimed is:

1. A method for generating a three-dimensional work piece, the method comprising the steps:
   applying a raw material powder onto a carrier by means of a powder application device,
   irradiating electromagnetic or particle radiation onto the raw material powder applied onto the carrier by means of an irradiation device,
   controlling the operation of the powder application device and the irradiation device so as to generate an information code pattern on or in the work piece, wherein the information code pattern is defined by the microstructure of the work piece;
   controlling the operation of the powder application device and the irradiation device so as to tailor the microstructure of the work piece such that a specific physically determinable microstructure parameter defining the microstructure is set in a first state or value and a second state or value based on the information code being represented by a first information code state or value and a second information code state or value, and
   wherein the first state/value of the specific physically determinable microstructure parameter corresponds to the first information code state/value and the second state/value of the specific physically determinable microstructure parameter corresponds to the second information code state/value.

2. The method of claim 1, further comprising the step:
   controlling the operation of the powder application device and the irradiation device so as to tailor the microstructure of the work piece such that the first state/value of the specific physically determinable microstructure parameter on the one hand and the second state/value of the specific physically determinable microstructure parameter on the other hand are defined by
   a first material composition or a first material distribution within the microstructure on the one hand and a second material composition or a second material distribution within the microstructure on the other hand,
   a relatively coarse grain size on the one hand and a relatively fine grain size on the other hand,
   a substantially directionally/dendritically solidified texture on the one hand and a substantially polycrystalline and/or substantially globulitic texture on the other hand,
   an anisotropic texture on the one hand and an isotropic texture on the other hand, and/or
   a first spatial direction of an anisotropic texture with respect to a build direction on the one hand and a second spatial direction of the anisotropic texture with respect to the build direction on the other hand,
   or vice versa.

3. The method of claim 1, further comprising the step:
controlling the operation of the powder application device and the irradiation device so as to tailor the microstructure of the work piece such that the first state/value of the specific physically determinable microstructure parameter on the one hand and the second state/value of the specific physically determinable microstructure parameter on the other hand are defined by
a first value of a mechanical property on the one hand and a second value of the mechanical property on the other hand,
a first value of an electrical property on the one hand and a second value of the electrical property on the other hand,
a first value of a thermal property on the one hand and a second value of the thermal property on the other hand,
a first value of a magnetic property on the one hand and a second value of the magnetic property on the other hand, and/or
a first value of a chemical property on the one hand and a second value of the chemical property on the other hand,
or vice versa.

4. The method of claim 1, further comprising the step:
controlling the operation of the powder application device and the irradiation device so as to tailor the microstructure of the work piece such that the first state/value of the physically determinable microstructure parameter is located on or restricted to a first spatial portion of the work piece and the second state/value of the physically determinable microstructure parameter is located on or restricted to a second spatial portion of the work piece, wherein the first and second portions are spatially disjoint.

5. The method of claim 1, further comprising the step:
controlling the operation of the powder application device and the irradiation device so as to tailor the microstructure of the work piece such that the information code pattern forms a two-dimensional matrix code.

6. The method of claim 5, wherein the two-dimensional matrix code is a Quick Response Code.

7. The method of claim 1, wherein the information code pattern is generated using an encoding scheme.

8. The method of claim 1, wherein the information code pattern is a biunique mapping of the information code onto the microstructure of the work piece.

9. The method of claim 1, wherein the information code pattern represents a production date, a production location, a production method, a production apparatus, a producer, a company, a production series, a serial number, an identification of the work piece, or a destination.

10. A method for generating a three-dimensional work piece, the method comprising the steps:
applying a raw material powder onto a carrier by means of a powder application device,
irradiating electromagnetic or particle radiation onto the raw material powder applied onto the carrier by means of an irradiation device,
controlling the operation of the powder application device and the irradiation device so as to generate an information code pattern on or in the work piece, wherein the information code pattern is defined by the microstructure of the work piece, and
controlling the operation of the powder application device and the irradiation device so as to tailor the microstructure of the work piece such that the information code pattern forms a linear barcode.

11. A method for generating a three-dimensional work piece, the method comprising the steps:
applying a raw material powder onto a carrier by means of a powder application device,
irradiating electromagnetic or particle radiation onto the raw material powder applied onto the carrier by means of an irradiation device,
controlling the operation of the powder application device and the irradiation device so as to generate an information code pattern on or in the work piece, wherein the information code pattern is defined by the microstructure of the work piece, and
controlling the operation of the powder application device and the irradiation device so as to tailor the microstructure of the work piece such that the microstructure of the work piece is defined by at least one of a size of grains, a grain morphology and a texture, wherein, in particular, the grain morphology and/or the texture of the microstructure is defined by at least one of a substantially directionally/dendritically solidified grain morphology, a substantially polycrystalline grain morphology, a substantially globulitic grain morphology, an anisotropic texture, an isotropic texture and a spatial direction of an anisotropic texture with respect to a build direction.

* * * * *